Figure 4:
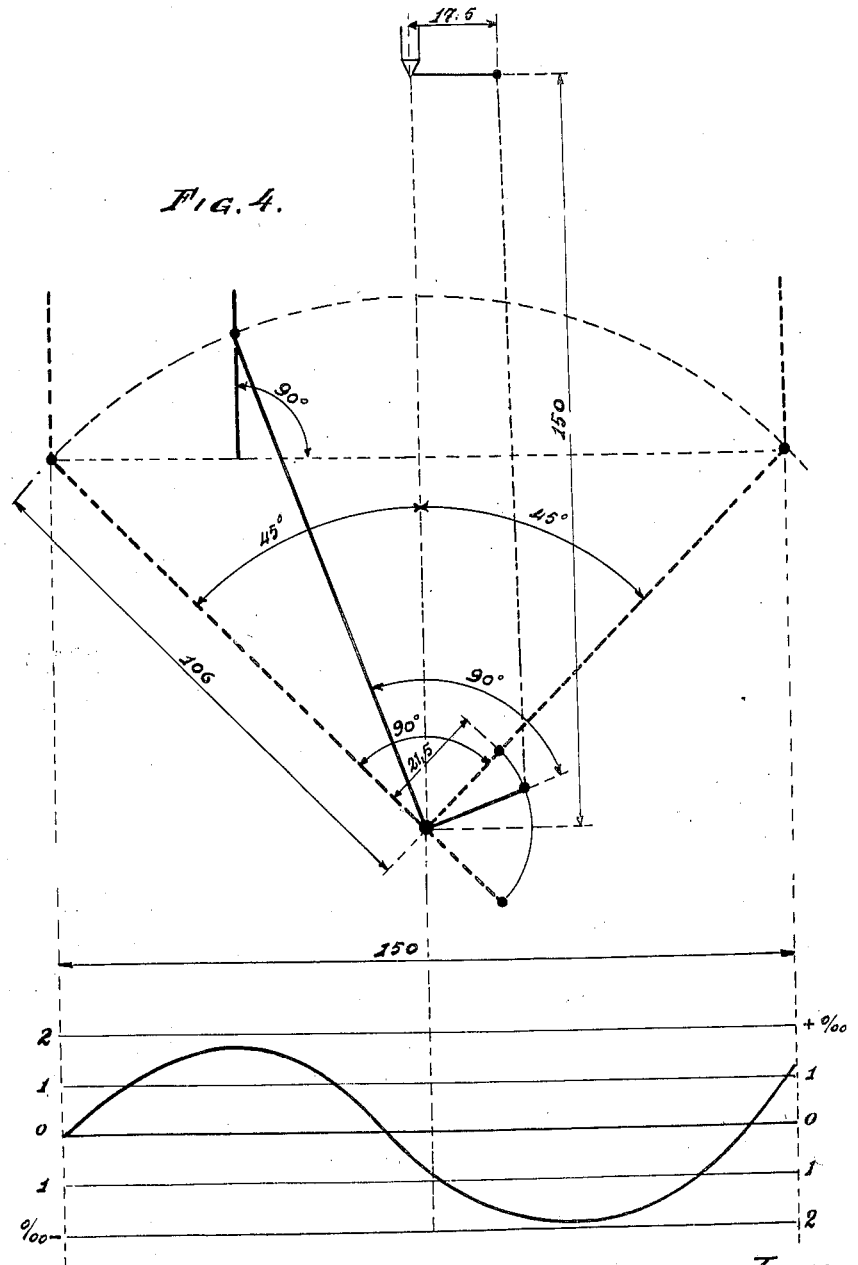

May 31, 1927.
B. USIGLI
1,630,989
ELECTRICAL MEASURING INSTRUMENT OF THE TYPE EMPLOYING A CONTROL MOTOR
Filed Sept. 7, 1926   2 Sheets-Sheet 1
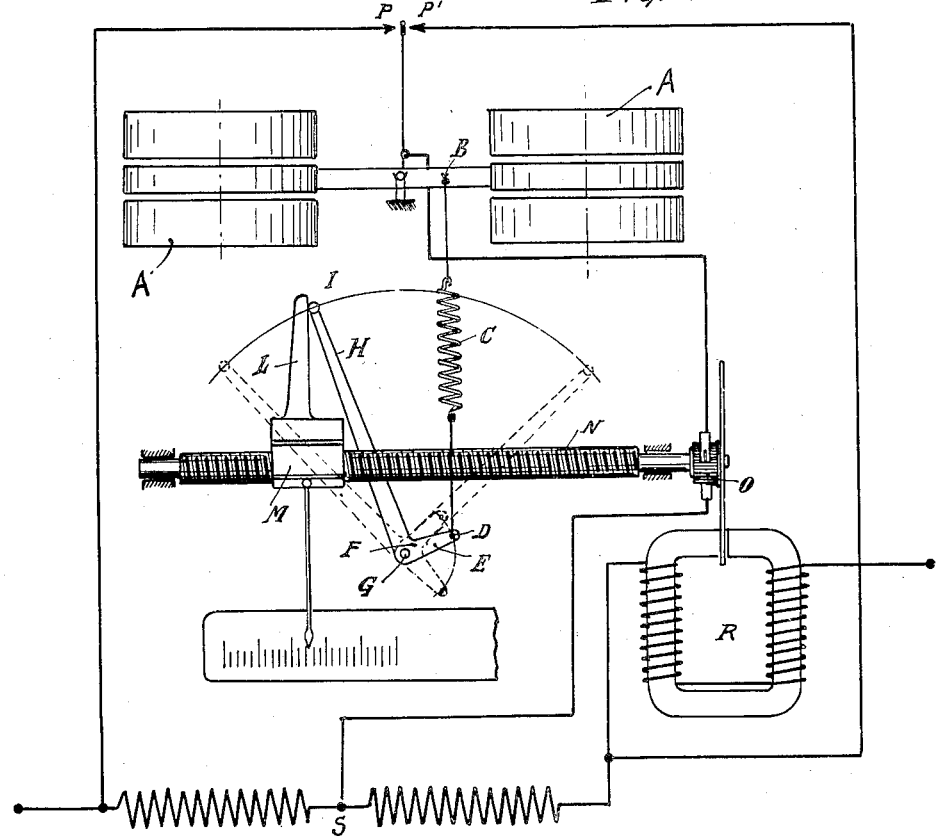
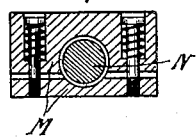
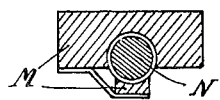
Inventor:
Bruno Usigli
By
Attorney May 31, 1927.  1,630,989
B. USIGLI
ELECTRICAL MEASURING INSTRUMENT OF THE TYPE EMPLOYING A CONTROL MOTOR
Filed Sept. 7, 1926  2 Sheets-Sheet 2

Inventor:
Bruno Usigli
By (signature)
Attorney.

Patented May 31, 1927.

1,630,989

UNITED STATES PATENT OFFICE.

BRUNO USIGLI, OF MILAN, ITALY, ASSIGNOR TO THE FIRM INSTRUMENTI DI MISURA C. G. S. SOCIETA ANONIMA, OF MILAN, ITALY.

ELECTRICAL MEASURING INSTRUMENT OF THE TYPE EMPLOYING A CONTROL MOTOR.

Application filed September 7, 1926, Serial No. 133,950, and in Italy September 24, 1925.

The present invention relates to improvements in measuring instruments operated according to a zero method and in which the indicating and registering elements are operated, not directly by the movable parts of the instrument, but through the medium of an appropriate servo-motor, driven from a suitable source of electrical energy, with the object of eliminating the disadvantages arising in such instruments from the considerable frictional resistance opposed to the movement of the pen or other recording element as it slides across the paper. The improvements are applicable to measuring instruments of many kinds such as relays, meters, or instruments adapted to be used for other purposes.

In those types of instruments already known, the movable parts of the instrument, on being moved from their position of equilibrium as the result of a variation of the quantity to be measured, close a circuit, thereby causing a servo-motor to rotate in a predetermined direction, said motor operating through suitable gears to vary the tension in an opposing spring and at the same time to move the indicating and registering members. The action of the servo-motor ceases only when the tension in the spring attains a value equal to the torque of the movable parts, which are then returned to their position of equilibrium, thereby opening the circuit and causing the operation of the motor to cease.

An apparatus of this nature is in theory a measuring instrument of absolute accuracy, and one in which the extent of movement of the indicating and registering members is exactly proportional to the torque of the movable parts of the instrument. Thus in an electrodynamic wattmeter, or in an ammeter or voltmeter embodying permanent magnets, the scale is absolutely uniform, while in an electro dynamic ammeter or voltmeter the scale is quadratic.

However, these apparatus have disadvantages which it is not possible to eliminate, the principal one of which is the unavoidable play which exists between the gears necessary for the transmission of the movement of the auxiliary motor to the spring and to the indicating and registering members. A further inconvenience is that the apparatus is complicated and is therefore necessarily of high cost.

In other types of apparatus attempts have been made to avoid these disadvantages by means of suitable movable systems provided with specially-constructed rotating guides which necessitate very laborious tests to obtain a desired proportional reading.

The apparatus forming the subject of the present invention has been designed with the object of overcoming the above enumerated difficulties, and it is characterized by a combination of movable elements which may be correctly defined as geometric.

The accompanying drawing shows by way of example in Fig. 1 an instrument embodying the present invention. Figs. 2 and 3 show constructional details of threaded bolts or screws arranged to form elastic couplings, and Fig. 4 shows an example of a diagram of errors in the readings given by an apparatus having the relative dimensions shown. Referring to Fig. 1 the instrument comprises essentially a double electro-dynamometer A arranged in the form of a Kelvin balance. At a predetermined point B on the movable parts of the instrument is connected one end of a tension spring C, the other end of which is connected to the short arm E of a bell crank lever F, which lever is adapted to pivot about a point G arranged in a vertical plane containing the axes of rotation of the movable parts. The longer arm H of the lever F carries a pivot I at its extremity, and this pivot I presses continually against a straight guide L. Continuous contact between pivot I and the guide L is assured by the tension upon spring C. In Fig. 1 the parts indicated by the letters O. R. S. comprise the armature, the field coils of the servo-motor and resistances, respectively, arranged in such a way as to control the rotation of the motor in one direction or the other according as the circuit is closed at P or P'. If the instrument, instead of being an electro dynamometer, is an ammeter or voltmeter having permanent magnets, the fixed windings A (Fig. 1) of the electro dynamometer are replaced by permanent magnets.

The guide L is rigidly connected to a travelling nut M and is arranged perpendicular to the axis of the screw N. The latter is rotated either directly or through suitable gears by the servo-motor in one direction or the other according to whether the couple to which the movable members are subjected is increased or diminished and the contact P or P' thereby closed.

It will be readily understood that on rotation of the screw N the nut M will be displaced and, through the medium of the guide L and the lever F, the tension upon the spring C will be varied and in consequence the moment which the spring exerts upon the movable members will be varied so as to move the latter into a new position of equilibrium, at the same time causing the breaking of the circuit and the consequent stopping of the motor.

Thus it will be seen that the relation between the torque upon the movable parts and the position of the indicating and registering members, which in hitherto known devices of apparatus was simply a function of the constants of the spring, is not one of simple proportionality in the arrangement in question. There are, however, an infinite number of series of relationships between the dimensions, the distances and the relative positions of the various elements comprised in the arrangement by which the said proportionality is assured in practice. Fig. 4 shows diagrammatically and by way of example a lay-out of the various geometric elements of the apparatus (the dimensions given being applicable to any units). At the lower part of the figure is shown the curve of the errors at the different points of the scale. These errors are less than those arising from the approximation which can be made even with precision measuring instruments and consequently the apparatus may be considered practically exact.

Naturally the function of the apparatus and, in consequence, the curve of errors vary somewhat with the relative dimensions of the various parts which do not form part of the movable transmission. A higher degree of accuracy is obtained by lessening the angle between the extreme positions of the bell crank lever and also when, without altering the other conditions, the distance between the axes of rotation of the movable parts and the bell crank lever is diminished. When, for very small readings, the scale is not sufficiently accurate, the desired result may be obtained by suitably shaping the guide L. It will also be clear that any play between the indicating and registering members and the spring control is obviated. The only play possible is that which may arise owing to wear taking place between the nut M and the screw N which may produce an inclination of the nut and of the recording member.

In order to provide for this contingency the nut may have the form shown in Figs. 2 or 3. According to these two constructions the nut is divided longitudinally into two parts which are connected together either, as shown in Fig. 2, by means of four screw bolts provided with cushioning springs, or by a leaf spring as shown in Fig. 3, so that the screw N is lightly gripped between the two parts of the nut. Thus all risk of play is eliminated even though the apparatus has been long in operation and has been subjected to various kinds of wear.

I claim as my invention:

1. An electrical measuring instrument of the type operated according to a zero method by means of a servo-motor acting upon the movable parts through the medium of a tension spring controlled by a nut adapted to slide along a screw rotated by the said motor, characterized in that the connection between the nut and spring is effected by means of a bell crank lever having arms of different lengths arranged to rotate in a plane parallel to the axis of the screw and about an axis contained in a plane perpendicular to the said screw and containing the axes of rotation of the movable parts, the short arm of the said bell crank lever being directly connected to the free end of the tension spring fixed to the movable parts of the instrument, while the long arm is in sliding engagement with a straight guide perpendicular to the axis of the screw and rigidly connected with the nut.

2. An instrument as claimed in claim 1 characterized in that the nut is divided longitudinally into two parts which are connected to one another by resilient means which cause them to grip the screw lightly.

In testimony whereof I affix my signature.

BRUNO USIGLI.